United States Patent Office 3,105,902
Patented Oct. 1, 1963

3,105,902
CONTROLLED ATMOSPHERE X-RAY
DIFFRACTION SPECTROMETER
Bernard Ostrofsky, Highland, and Frederick L. Eberle,
Hammond, Ind., assignors to Standard Oil Company,
Chicago, Ill., a corporation of Indiana
Filed Sept. 19, 1960, Ser. No. 56,779
3 Claims. (Cl. 250—51.5)

This invention relates to X-ray diffraction spectrometers, and more particularly concerns an improved goniometer assembly enabling X-ray diffraction analyses to be conducted in a controlled atmosphere.

X-ray diffraction spectrometers are widely used laboratory and industrial analytical devices. A strong source of X-rays is directed to the sample under analysis, which may be a solid, powder, or liquid. Atoms of the elements comprising the sample are excited causing emission of secondary X-rays. These secondary X-rays have characteristic wave lengths that make X-ray emission spectrometry possible. That is, each element has its own characteristic emission lines or spectrum.

The emitted X-radiation with its many wave lengths is then directed to an analyzing critical through a confining tunnel. This crystal performs the function of a three-dimensional diffraction grating. Only those wave lengths are diffracted that satisfy the Bragg equation, $$n\lambda = 2d \cdot \sin \theta$$

where $n$ is the order of reflection, $\lambda$ the wave length, $d$ the distance between atomic planes of the crystal, and $\theta$ the angle of incidence on the atomic planes. The value $d$ is known because an analyzing crystal of known $d$ spacing is used. The crystal is rotated by a device called a spectrogoniometer, and the various two-$\theta$ angles are measured. From the Bragg equation $\lambda$ is then determined. Convenient tables are available that provide direct reading of wave length and identification of the element.

Quantitative analysis of diffracted X-rays at one or more particular two-$\theta$ angles are counted by a suitable counter tube, which converts detected X-rays into electrical pulses. These are amplified and counted for a preset time by a scaler, and quantitative analytical information can be determined from the scaler directly, or from a digital printer.

Because X-ray radiation from low atomic number elements is greatly attenuated in passing through air, it has been the practice to employ an artificial atmosphere of helium or hydrogen in the X-ray path. Otherwise diffraction spectrometry would be limited to elements having atomic numbers above about 20. This artificial atmosphere is conventionally provided by enclosing the analyzing crystal in a chamber made of rubber or like material, which provides both gas tightness and the requisite flexibility for rotation.

These flexible chambers however give rise to several serious problems. For one, they rupture easily. For another, it has been found that slight changes in volume caused by flexing the chamber cause a change in atmosphere pressure and result in a noticeable distortion of detected secondary X-rays. Additionally, they cannot be used for analysis made under vacuum.

Accordingly, a major object of the present invention is to provide an X-ray diffraction spectrometer having a rupture-proof goniometer assembly. Another and most important object is to provide an atmosphere for X-ray diffraction spectrometry which remains at constant pressure irrespective of goniometer movements. A further object is to provide a goniometer assembly which may be employed not only with helium or hydrogen but also for analyses under vacuum, thereby permitting unprecedented resolution of secondary X-rays from very low atomic number elements. Other and more particular objects will become apparent as the description of this invention proceeds in detail.

Briefly, in accordance with the invention, there is provided a rigid jacket or chamber surrounding the analyzing crystal. A first tunnel, rigidly affixed to the chamber, connects with either the sample or with the X-ray detector. A movable tunnel, communicating with the other the jacket or crystal, extends to an arcuate slot on a cylindrical surface of the chamber, and exposed portions of this slot are sealed with a pair of ribbon-like spiral negative springs. Thus any rotation of the goniometer assembly causes the movable tunnel to rotate in an arc corresponding to the chamber slot, and since this slot is continuously sealed by the springs there is no opportunity for gas to leak into or out of the jacket.

The invention will be described in more detail in the ensuing specification which is to be read in conjunction with the attached drawings wherein.

Figure 1:
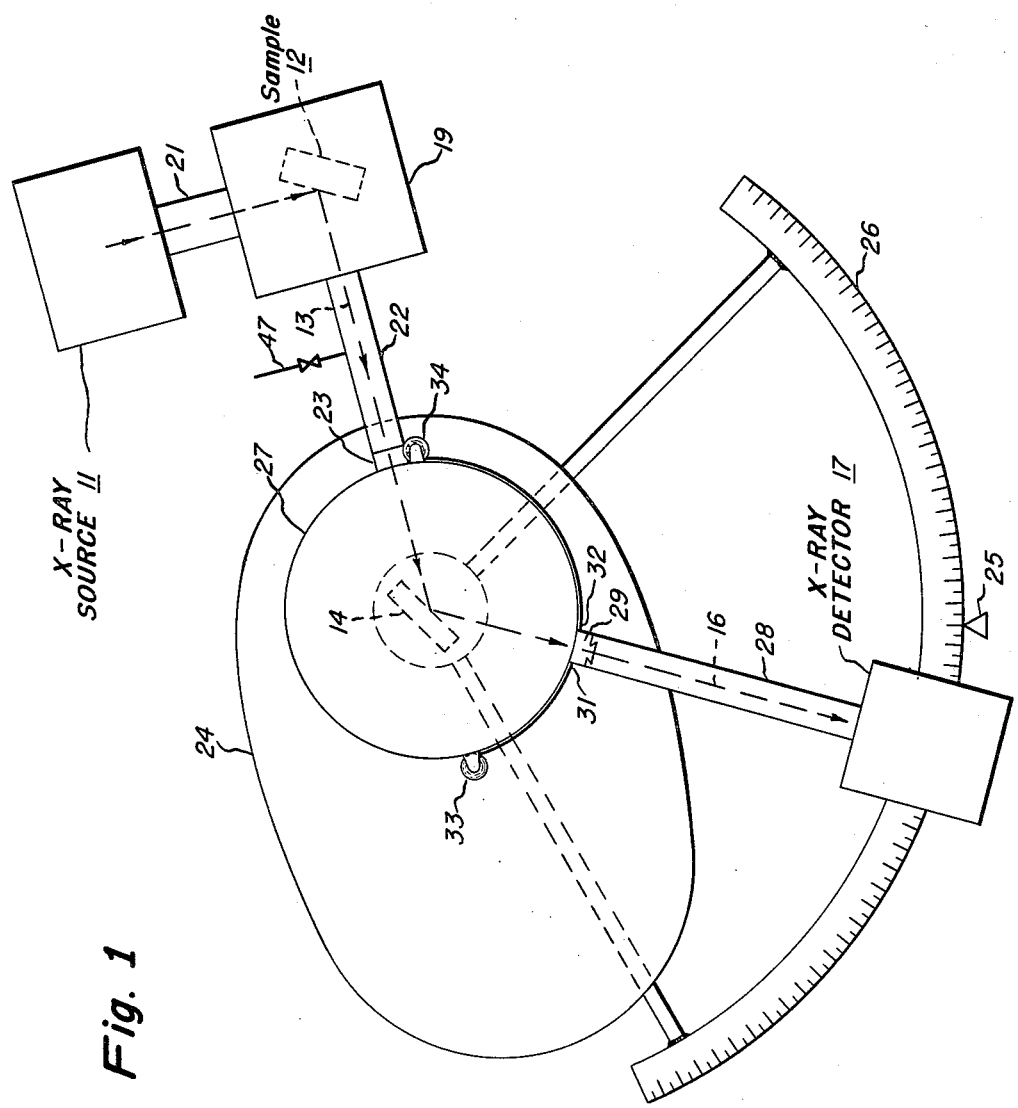
FIGURE 1 is a top view showing a preferred embodiment of the invention.

Turning first to FIGURE 1, X-rays from source 11 impinge on sample 12, causing it to emit secondary X-rays 13 which are diffracted by an analyzing crystal 14, of sodium chloride or the like, from whence diffracted X-rays 16 are sent to X-ray detector 17.

Sample 12 is enclosed in a suitable container 19, and receives primary X-rays from source 11 via a windowed tunnel 21. In most conventional spectrometers source 11 is positioned above sample 12 but is shown spaced alongside in the drawing for simplicity and convenience of presentation.

Container 19 is coupled to a rigid cylindrical container 27 by way of a fixed tunnel 22, which may be rectangular in cross-section. Tunnel 22 connects with chamber 27 at a port member 23, to be described in more detail in conjunction with FIGURE 2.

Chamber 27 is coaxial with crystal 14, and the latter may be rigidly mounted in position in this chamber. Crystal 14 is directly mounted to an angular scale 26 which indicates the angular position of this crystal. A suitable gear device 24 is also provided to afford Brentano parafocusing geometry. That is, X-ray detector 17 and rigid chamber 27 rotate at twice the angular distance or velocity that analyzing crystal 14 rotates around a common axis perpendicular to the X-ray beam. The crystal angle is measured by means of indicator 25.

X-ray detector 17 communicates with chamber 27 via a movable tunnel 28, which is secured to a movable port member 29. Movable port member 29 in turn carries the free ends 31 and 32 of coiled ribbon-like spiral negative springs 33 and 34, the axes of which are carried by chamber 27. As a consequence of this arrangement X-ray detector 17 may be rotated freely about the axis of crystal 14 while container 27 and its associated tunnels 22 and 28 are maintained in a gas tight state.

Figure 2:
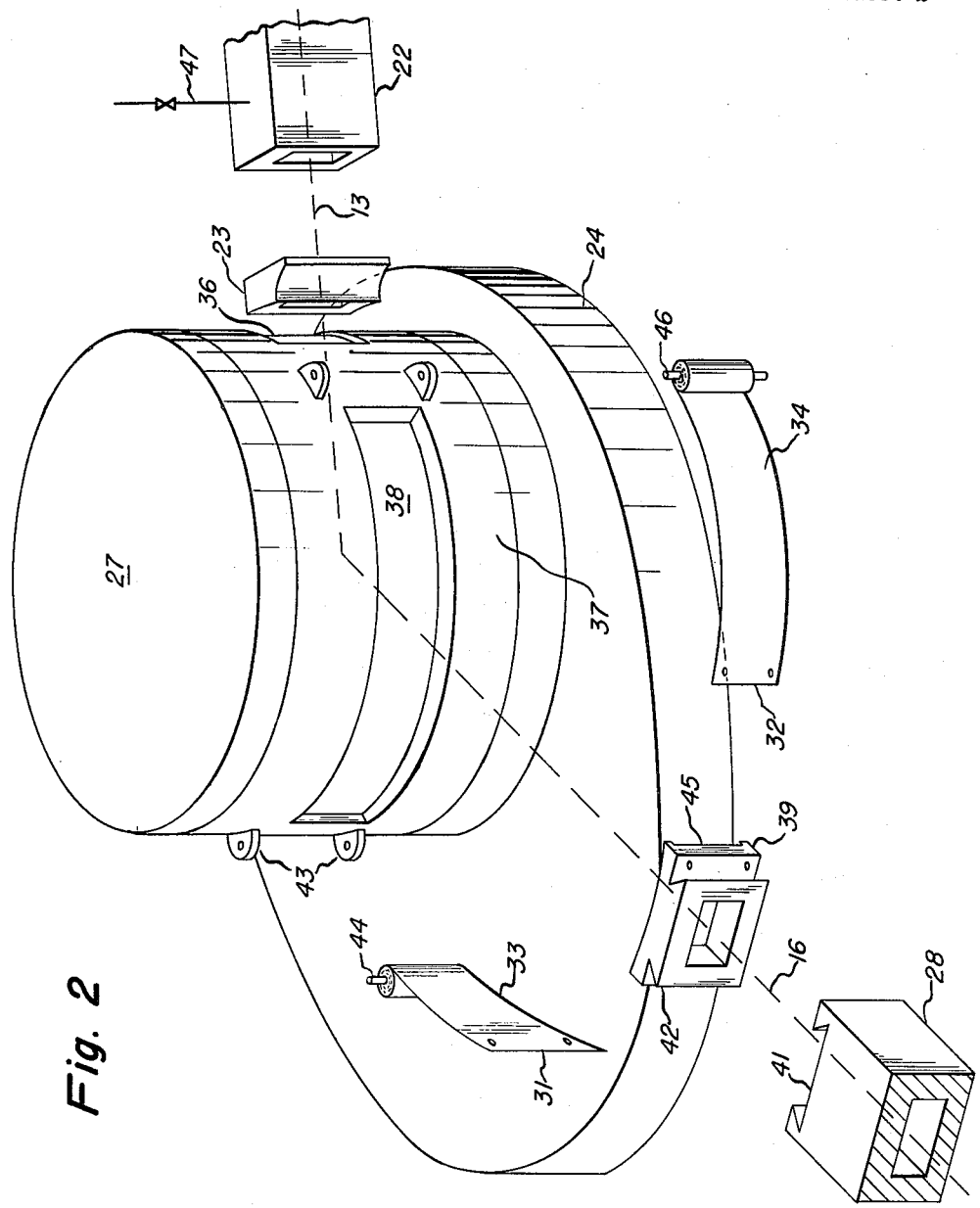
FIGURE 2 is an exploded isometric of the embodiment depicted in FIGURE 1.

Now directing attention to FIGURE 2, an exploded isometric view of the embodiment depicted in FIGURE 1 is presented in detail. It will be observed that fixed tunnel 22 is secured to a port member 23 by suitable bolts, not shown, and in turn port member 23 is rigidly attached to a port 36 in the cylindrical surface 37 of rigid chamber 27.

Arcuate slot 38 is clearly shown in FIGURE 2 and is seen to be a rectangular slot perpendicular to the axis of crystal 14 (in FIGURE 1).

Movable tunnel 28 is dovetailed into movable port member 39 via dovetails 41 and 42, and movable port member 39 is free to move in an arc along slot 38.

Chamber or jacket 27 carries four bearings 43, spaced on opposite ends of slot 38 and adapted to receive the ribbon-like spiral negative springs 33 and 34 at their pivotable shaft ends 44 and 46.

These negative springs are of a type which is commercially available and which are described in an article by Cook and Clarke, "The Negative Spring—A Basic New Elastic Member," Prod. Eng., July 1949, pages 136–140, and in U.S. Patent 2,811,201. Briefly, negative springs are spiral strips of spring material which are formed with a radius of curvature smaller than the spiral at any point, so that the spring tends to coil upon itself rather than to uncoil. With a pair of oppositely mounted springs 33 and 34 as shown, the coiling forces of each spring cancel each other, and consequently movable tunnel 28 will remain in any position without being urged toward either spring.

As shown in FIGURE 2 the free ends of the respective springs are received in receded slots 45 of movable port member 39 while the pivoting ends of the respective springs are carried by chamber 27. It has been found that this arrangement of free spring ends carried by the movable port member 39 or movable tunnel 28 and the rotating ends carried by the chamber affords a somewhat more simple construction, although the springs 33 and 34 will slide over cylindrical surface 37 as the X-ray detector 17 (FIGURE 1) is rotated. The alternative arrangement, where the coiled ends of springs 33 and 34 are carried by movable port member 39 may alternatively be employed; in which event there is no sliding of the springs.

To provide an atmosphere of low molecular weight gas such as hydrogen or helium, or to maintain a vacuum within the chamber 27 and associated tunnels, a valved line 47, shown symbolically, may be provided. This may communicate with any portion of the system, and it will be understood that external components (such as X-ray detector 17 and sample container 19 of FIGURE 1) are constructed to be substantially leak free so as to maintain this atmosphere.

Not shown in FIGURE 2 is a guide which may be placed alongside slot 38. This guide may comprise two strips of rectangular cross-section, each spaced a short distance away from slot 38 to serve as guides for springs 33 and 34. These are not essential and may be dispensed with, particularly when relatively thick spring stock is employed.

It is thus evident that the objects of this invention have been fully satisfied, and a spectrogoniometer assembly has been provided which permits the employment of controlled atmospheres in an X-ray diffraction spectrometer while, at the same time, assuring against leaks and against any pressure changes in the atmosphere when rotating the detector.

From the foregoing description it is manifest that many alternatives, modifications, and variations will be evident to those skilled in the art in light of the foregoing description. Accordingly, it is intended to embrace all such alternatives, modifications, and variations as fall within the spirit and broad scope of the appended claims.

We claim:

1. In a goniometer for an X-ray diffraction spectrometer, including a source of X-rays incident on a sample to produce secondary X-rays, a rotatable analyzing crystal diffracting said secondary X-rays, and an X-ray detector coaxially rotatable around said crystal, the improvement whereby the volume and pressure of the path through which said secondary X-rays travel is maintained constant comprising: a constant volume, essentially gas-tight, enclosure comprising a rigid jacket surrounding the analyzing crystal, a cylindrical arcuately-slotted surface on said jacket coaxial with said analyzing crystal; a fixed tunnel establishing communication between said jacket and either said sample or said X-ray detector; a movable tunnel establishing communication between said jacket and the other of said sample or said X-ray detector through said arcuate slot; and a pair of oppositely mounted ribbon-like spiral negative springs carried by said movable tunnel and said jacket to seal exposed portions of said slot.

2. Apparatus of claim 1 wherein said fixed tunnel establishes communication between said jacket and said sample, and said movable tunnel establishes communication between said jacket and said X-ray detector.

3. In a goniometer for an X-ray diffraction spectrometer, including a source of X-rays incident on a sample to produce secondary X-rays, a rotatable analyzing crystal diffracting said secondary X-rays, and an X-ray detector coaxially rotatable around said crystal, the improvement whereby the volume and pressure of the path through which said secondary X-rays travel is maintained constant comprising: a constant volume, essentially gas-tight, enclosure comprising a rigid chamber surrounding the analyzing crystal, a cylindrical arcuately-slotted surface on said chamber coaxial with said analyzing crystal; a fixed port member carried by said chamber; a first tunnel establishing communication between said fixed port member and said sample; a movable port member adjacent said arcuate slot; a second tunnel establishing communication between said movable port member and said X-ray detector; and a pair of opposite mounted ribbon-like spiral negative springs sealing exposed portions of said arcuate slot, the free ends of each of said springs being carried by said movable port member and the axial ends of said springs being rotatably carried by said chamber.

References Cited in the file of this patent

UNITED STATES PATENTS

| | | |
|---|---|---|
| 2,601,361 | Blatz | June 24, 1952 |
| 2,635,192 | Cordoni | Apr. 14, 1953 |
| 2,811,201 | Reid | Oct. 29, 1957 |
| 2,924,715 | Hendee et al. | Feb. 9, 1960 |